June 20, 1933. W. J. BUEHRING 1,914,881
PROCESS OF SOLDERING AND ANNEALING
Original Filed March 25, 1929

Inventor
William J. Buehring

Patented June 20, 1933

1,914,881

UNITED STATES PATENT OFFICE

WILLIAM J. BUEHRING, OF CHICAGO, ILLINOIS

PROCESS OF SOLDERING AND ANNEALING

Application filed March 25, 1929, Serial No. 349,675. Renewed December 8, 1932.

My invention relates to a method of soldering and annealing certain types of electrical devices, and means for carrying out this method.

More particularly, my invention relates to improvements in a supporting clamp for supporting lead-in wires and the like and a method and means whereby it may have one portion thereof assembled by soldering the elements together while another portion of the clamp is being treated so as to anneal the same.

I will describe one form which the invention may take by reference to the accompanying drawing, wherein—

Figure 1:
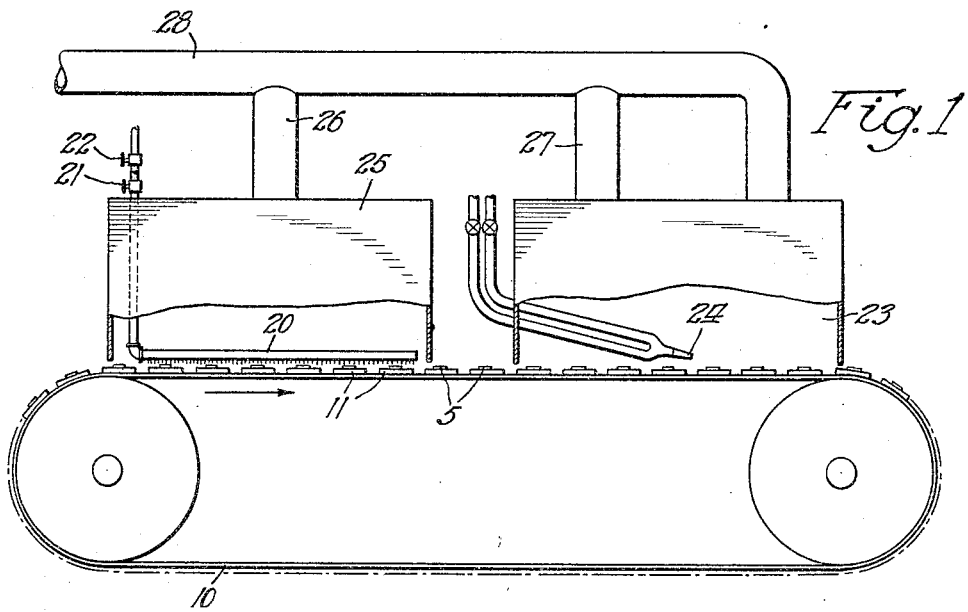
Fig. 1 is a side view, partly in section, of a machine utilized in carrying out my improved process.
Figure 2:
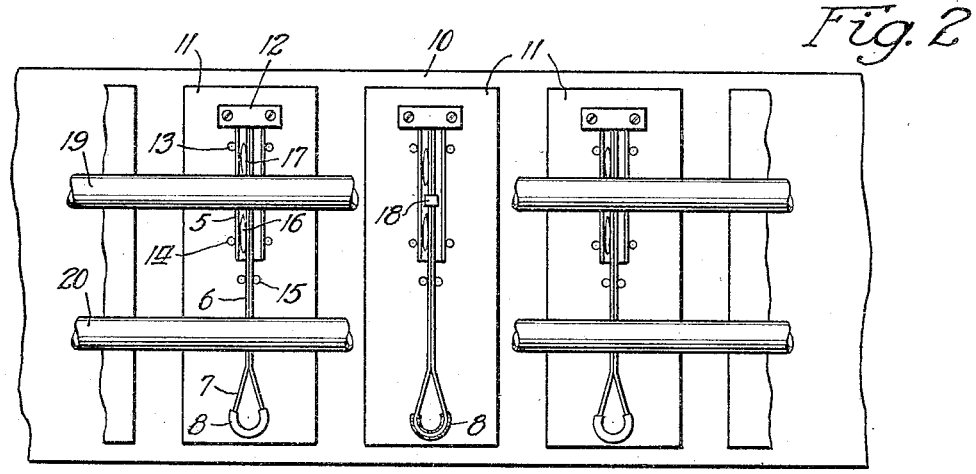
Fig. 2 is a top plan view of a portion of the machine shown in Fig. 1.
Figure 3:
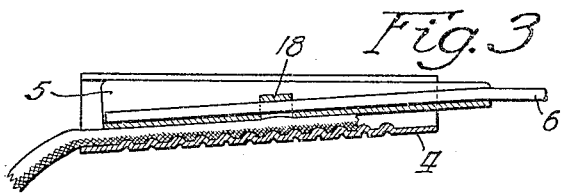
Fig. 3 is a detail showing part of the clamp which is treated in the machine.

These clamps to which my method applies consist of a shell 4, a wedge portion 5 and a portion 6 by means of which the lead-in wires clamped by the portions 4 and 5 may be mounted upon a supporting insulator or hook. The wire 6 is soldered to the wedge portion 5 and has the end portion at 7 formed in an open loop, as shown, so as to permit spreading of the wires and their engagement over an insulator or hook. The sleeve 8 is applied to the portion 7 to give added strength thereto where it leads around the insulator or hook.

Now, in constructing this clamp, it is desirable to have the wire portion adjacent the loop 7 as soft as it can safely be to have the requisite strength, so that the operator when fastening the clamp on to an insulator may spread the wires apart by hand, and then readily twist it upon the support. However, if a soft wire is used, then it has a tendency, owing to its softness, to stretch where it is soldered on to the clamp, so as to break away from the solder and eventually come loose. This is due to the fact that as the wire stretches in length it becomes smaller in diameter, and naturally will break away from the surrounding solder.

In making the clamps according to my invention, I utilize for the wire 6 a hard, or medium hard, copper wire that will hold to the solders and withstand the amount of force applied to the clamp. This wire is then soldered into the clamp with the least possible softening effect in soldering. That is to say, the temperature of the solder is simply maintained sufficiently high to cause it to melt and make a good binding between the clamp 5 and the wire 6, and this temperature is low enough so that it does not have any appreciable annealing effect upon the copper wire itself.

At the same time the soldering operation is carried on, I apply heat to that portion of the wire adjacent the loop 7 by subjecting it to the flame of a gas burner, or any other suitable source of heat, so as to anneal this portion of the wire and render it fairly soft. The resultant clamp then has the advantage of a soft loop part, which may be spread by hand and twisted readily, and a hard part soldered to the clamp, which does not stretch and break away from the solder when the clamp is in use.

In carrying out the invention, I provide a conveyor 10 with suitable plates 11, upon which are mounted end blocks 12 and guide pins as indicated at 13, 14 and 15, so that the wire carrying portion 5 of the clamp may be suitably seated on the plates 11, and a wire, such as the wire 6, seated in the portion 5 and held in place by the projections 15. Lengths of solder, such as indicated at 16 and 17, are then dropped in to the clamp portion 5 on opposite sides of the up-struck loop 18, which is struck up from the bottom of the portion 5 so as to permit the wire 6 to pass thereunder. The conveyor then carries the mounted clamp beneath a pair of gas burners 19 and 20, which, as shown in Fig. 1, have individual control valves 21 and 22, and these burners serve to impart the proper amount of heat to melt the solder lengths 16 and 17 and to heat the extended portion of the wire 6 the proper amount to anneal it. It is, of course, necessary to heat the portion of the wire which is annealed considerably hotter than the portion where the soldering is being done, but the individual control of the gas burners makes this easy to do.

After the clamp units come out from under the heating elements, the solder is then cooled within the compartment 23 by a combined air and water jet from the nozzle 24.

Considerable difficulty was encountered in the initial carrying out of this process in cooling the solder. If water dropped on it the solder would curdle and would not hold well, so I employ the nozzle 24 containing a fine spray of water by forcing it through the nozzle by air pressure, and this serves effectively to cool the solder in the proper manner. The annealed portion of the wire, of course, is allowed to cool without being subjected to any cooling agent such as water.

Housings 23 and 25 covering the heating and spraying elements may be provided with suitable outlets such as 26 and 27 leading to an air conduit 28 that may be connected to any suitable source for drawing the fumes arising from the burners and the sprayer out of the room.

From the above description, it will be seen that I have provided a method whereby a soldering and annealing operation may be simultaneously carried on upon the same article to thereby provide a much more efficient article than could be obtained by using wire having the proper hardness for good soldering or wire having the degree of softness required for efficient handling.

Having thus described my invention, what I claim as new and desire to secure by Letters Patent is:

1. A method of making a wire clamp of the character described which consists in temporarily connecting the supporting loop thereof to one of the clamping elements, applying solder to this connection, and simultaneously subjecting said connection and a portion of the loop at a distance from said connection to sufficient amounts of heat to melt the solder and to anneal said portion of the loop.

2. A method of making a wire clamp of the character described which consists in temporarily connecting the supporting loop thereof to one of the clamping elements, applying solder to this connection, and simultaneously subjecting said connection and a portion of the loop at a distance from said connection to sufficient amounts of heat to melt the solder and to anneal said portion of the loop, and thereafter subjecting the soldered connection to a cooling spray.

In witness whereof, I hereunto subscribe my name this 13th day of March A. D., 1929.

WILLIAM J. BUEHRING.